S. W. COX.

Spring Scale.

No. 69,774.

Patented Oct. 15, 1867.

Witnesses;
Theo Tusche
J Alsun Fraser

Inventor;
S H Cox
Per Munn &Co
Attorneys

United States Patent Office.

S. W. COX, OF NEW HAVEN, CONNECTICUT.

Letters Patent No. 69,774, dated October 15, 1867.

IMPROVED SCALES.

*The Schedule referred to in these Letters Patent and making part of the same.*

TO ALL WHOM IT MAY CONCERN:

Be it known that I, S. W. Cox, of New Haven, in the county of New Haven, and State of Connecticut, have invented a new and useful Improvement in Scales; and I do hereby declare that the following is a full, clear, and exact description thereof, which will enable others skilled in the art to make and use the same, reference being had to the accompanying drawings, forming part of this specification.

The present invention relates to that class of weighing-scales more particularly used for the weighing of letters and other light mail matter; and the invention consists in a novel construction of the scale, whereby all the advantages of a balance-scale are secured thereto, cheapness, durability, perfect accuracy, and ease of regulation. In the accompanying plate of drawings my improvements in scales are illustrated—

Figure 1:
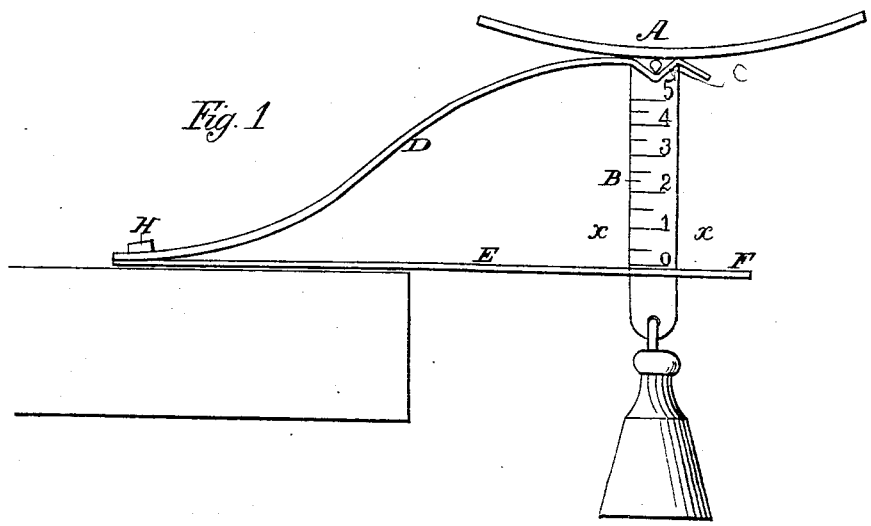

Figure 1 being a side elevation of the same, and

Figure 2:
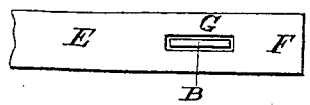

Figure 2 a detail view, to be hereafter referred to.

A, in the drawings, represents the pan to the scales, on which pan the letters, etc., to be weighed are placed. This pan A upon its under side is provided with an upright centre arm or spindle, B, that, along one edge, is marked or graduated off, and such graduations numbered from 0 to 5, inclusive, or any other number, according to the adjustment of the scale, for the indication of the weight of the articles. This spindle B has upon each side, at opposite points, a pin or pivot, $a$, by which the pan is suspended in the notch C to the outer end of a bent spring, D, that, at its other end, is fixed to a bed-piece, E. This bed-piece E extends under the pan A, and at its end F is provided with a slit or slot, G, for the arm of the pan to play through, by means of which the depression of the pan is indicated, and thus the weight of the articles thereon. H a screw for fastening the scale to a desk or other place.

Having thus described my invention, I claim as new, and desire to secure by Letters Patent—

A scale for weighing letters, etc., constructed so as to operate substantially as described.

S. W. COX.

Witnesses:
  L. E. BRALEY,
  I. C. WILLIAMS.